Figure 1:
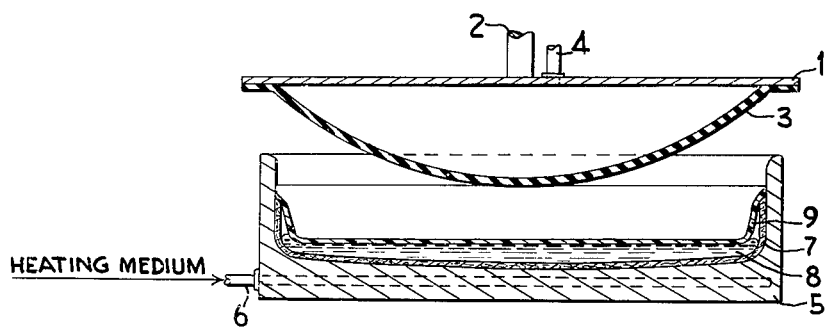

Jan. 25, 1966  M. WISMER ETAL  3,231,634
MIXTURE OF UNSATURATED POLYESTER RESIN AND
POLYMER OF A CONJUGATED DIENE
Filed July 11, 1961

INVENTORS
MARCO WISMER and
LAMBERT F. MINUCCI
BY
Oscar L. Spencer
ATTORNEY

United States Patent Office 3,231,634
Patented Jan. 25, 1966

3,231,634
MIXTURE OF UNSATURATED POLYESTER RESIN AND POLYMER OF A CONJUGATED DIENE
Marco Wismer, Richland Township, Gibsonia, and Lambert F. Minucci, Pittsburgh, Pa., assignors to Pittsburgh Plate Glass Company, Pittsburgh, Pa., a corporation of Pennsylvania
Filed July 11, 1961, Ser. No. 123,150
9 Claims. (Cl. 260—862)

This invention relates to novel and useful resinous compositions, and pertains more particularly to compositions comprising an unsaturated polyester resin and a polymer of a conjugated diene.

Unsaturated polyester resins, that is, copolymerizable mixtures of (1) a polyester of an alpha,beta-ethylenically unsaturated dicarboxylic acid, optionally a saturated dicarboxylic acid, and a dihydric alcohol, and (2) an ethylenically unsaturated monomer capable of cross-linking the polyester molecules at the points of unsaturation, are extensively utilized commercially as molding resins. These resins can be utilized in the production of a wide variety of shaped articles such as boats, automobile bodies, heater housings, containers of various types, toys, awnings and the like. One particular advantage obtained by the use of unsaturated polyester resins in molding operations is the fact that little and sometimes no pressure need be used. Low pressure molding is possible because no condensation by-products that must be removed are formed during the curing of such resins.

Various molding methods may be employed, including the "hot press" technique, in which a rubber plunger is used to apply pressure, vacuum or pressure bag molding, no pressure molding such as the double-mold vacuum injection process, compression and transfer molding with chopped glass reinforced polyesters, and matched metal die moldings. In nearly all of these molding processes the unsaturated polyester resin is reinforced with a material such as glass fiber, which is preferred, or other reinforcing materials such as asbestos, cotton, silica, or other similar materials.

In many instances, however, moldings and castings prepared from unsaturated polyester resins fail or are defective in that they are subject to cracking or crazing, or contain pits which render the casting porous, or will not stand severe shock without breakage. Also, in many instances it is extremely difficult to remove the molded part from the mold because of sticking of the resin to the mold surface. These defects are particularly serious in molded objects having severe curvatures, for example, as in suitcases, boats and the like.

It has now been discovered that the above deficiencies can be substantially overcome or at least greatly minimized, and outstanding moldings and castings obtained by the expedient of incorporating a small amount of a polymer of a conjugated diene into the polyester resin composition. By combining a polymer of a conjugated diene with an unsaturated polyester resin, castings and moldings can be obtained which release without difficulty from the mold or casting cell, and yet are free from cracking, crazing and porosity.

It is quite surprising that a small amount of a polymer of a conjugated diene eliminates the serious problems encountered during molding of an unsaturated polyester resin since even large amounts of plasticizers do not alleviate this situation. Amounts of a polymer of a conjugated diene as low as 1 percent are very effective in combating and eradicating the deficiencies of molded or cast unsaturated polyester articles.

The benefits of this invention are significant in view of previous efforts to alleviate the cracking and crazing of unsaturated polyester articles during molding and during the subsequnt curing of thermoset protective and decorative coatings. Plasticizers such as dioctyl phthalate, butyl benzyl phthalate, capryl glycollate, acetyl tributyl citrate, epoxidized oils, tricresyl phosphate, tricapryl phosphate, mixed alkyd phthalates, and the like have been utilized in an attempt to diminish the cracking and crazing problem hereinabove mentioned. However, the resulting improvement is slight even at levels of plasticizer many fold the low level of polymers of conjugated dienes required to effect significant improvement. The use of such high levels of plasticizer, besides imparting only slight improvement, also adversely affects some physical properties of the molded unsaturated polyester article, such as heat distortion, tensile strength and flexural strength. Low levels of plasticizers of the type described above, when incorporated in an unsaturated polyester, produce no noticeable change in physical properties, but neither do they improve the cracking and crazing of the molded article.

The composition of the polymerizable unsaturated polyester resin component of the compositions of this invention may be varied widely. The polymerizable unsaturated polyester portion thereof is ordinarily prepared by the reaction of an alpha, beta-ethylenically unsaturated dicarboxylic acid, or an admixture of such an acid with a saturated dicarboxgylic acid, and a dihydric alcohol. Among the ethylenically unsaturated dicarboxylic acids which may be used are maleic acid, fumaric acid, mesaconic acid, aconitic acid, citraconic acid, ethyl maleic acid, xeronic acid, itaconic acid, and the lke. Halogen substituted derivatives of these acids may also be utilized. The anhydrides of these acids, where the anhydrides exist, are, of course, embraced under the term "acid" since the reaction products or polyesters obtained by utilizing such acids and anhydrides are the same, and, in fact, in many instances it is preferred to utilize the anhydride rather than the free acid.

The dihydric alcohol component of the polyester includes such compounds as ethylene glycol, diethylene glycol, triethylene glycol, polyethylene glycol, 1,3-propanediol, 1,2-propanediol, di-1,3-propanediol, butylene glycol, halogen substituted glycols, and the like. Small amounts of polyols with a functionality greater than two may be utilized in conjunction with the dihydric component.

As indicated hereinabove, in many instances it is desirable to utilize a portion of a saturated dicarboxylic acid in conjunction with the ethylenically unsaturated dicarboxylic acid component. Examples of useful saturated acids include phthalic acid, isophthalic acid, terephthalic acid, succinic acid, adipic acid, suberic acid, azelaic acid, sebacic acid, dimethyl succinic acid, as well as halogenated derivatives of the above acids, and the like.

The inclusion of a saturated dicarboxylic acid, such as described hereinabove, in an unsaturated polyester resin does not alter the benefiicial effects realized from the addition of a small quantity of polymer of a conjugated diene. Generally, a saturated dicarboxylic acid is included as one of the components utilized in the preparation of an unsaturated polyester resin as some physical properties are improved by such inclusion. The term "unsaturated polyester resin" as used in the resin industry is interpreted as a resin utilizing an unsaturated dicarboxylic acid as at least a portion of the acid component of the polyester; therefore, the term embraces those resins which also utilize a saturated dicarboxylic acid as a portion of the acid component.

Of the saturated dicarboxylic acids utilized as one of the components in the preparation of unsaturated polyester resins, isophthalic acid is becoming increasingly important. In view of the increased utilization of isophthalic acid, the beneficial results of the herein described invention are quite significant inasmuch as the most improvement effected by the addition of a small quantity of a polymer of a conjugated diene to an unsaturated polyester resin occurs when the saturated dicarboxylic acid utilized is isophthalic acid.

The preparation of the polymerizable unsaturated polyester from materials of the type listed hereinabove, is a well known procedure, being disclosed in detail, for example, in U.S. Patents 2,570,269, 2,578,690, 2,593,787, 2,627,510, 2,646,416 and 2,740,765, as well as in texts such as Polyesters and Their Applications, Bjorksten et al., Reinhold Publishing Corporation (1956) and Polyester Resins, Lawrence, Reinhold Publishing Corporation (1960). The disclosures of these patents and the Bjorksten et al. and Lawrence texts are incorporated herein by reference.

The copolymerizable polyester resins obtained by the various procedures set forth in the patents and texts listed hereinabove can be readily cross-linked by uniting them with monomeric compounds containing a $CH_2=C<$ group. Styrene and vinyl toluene are most frequently utilized as the cross-linking monomer, although many other monomers may also be employed. Such other monomers include divinyl benzene, ethyl alpha-methyl styrene, chloro- and fluoro-styrenes, diallyl phthalate, dimethallyl phthalate, triallyl cyanurate, allyl diglycolate, diallyl phenyl phosphonate, diethylene glycol bis (allyl carbonate), 1,2-propylene glycol bis (allyl carbonate), bis (allyl lactate) carbonate, allyl succinyl allyl glycolate, allyl maleate, methallyl maleate, alkyl methacrylates such as methyl methacrylate and ethyl methacrylate, alkyl acrylates such as methyl acrylate, ethyl acrylate, propyl acrylate and butyl acrylate, vinyl acetate, allyl acetate, and the like. In addition to the foregoing monomeric compounds, which are merely representative, any $$CH_2=C<$$

group containing monomer or mixtures of such monomers may be utilized if desired.

The $CH_2=C<$ group containing monomer is ordinarily utilized in an amount of 10 percent to 60 percent by weight of the copolymerizable mixture of polyester and monomer, and preferably in an amount of from 20 percent to 50 percent by weight.

The copolymerizable mixtures of unsaturated polyesters with vinylic monomers may, of course, contain such additional materials in inhibitors, many of which are disclosed in the patents listed hereinabove, light stabilizers such as hydroxy-substituted benzophenones, fillers, and the like.

The polymer of a conjugated diene which is blended with the unsaturated polyester resin according to the present invention, can be either homopolymers or copolymers prepared from diene monomers such as butadiene, isoprene, dimethyl butadiene, haloprenes, 2-chloro-3-methyl butadiene, piperylene, cyclopentadiene, hexhalocyclopentadiene, 2-chlorocyclopentadiene, methyl cyclopentadiene, 5,5-dimethyl cyclopentadiene, 1,5,5-trimethyl cyclopentadiene, triphenyl cyclopentadiene and the like. It is important, in accordance with this invention, that polymers prepared from the above listed monomers contain at least a small proportion of ethylenically unsaturated reactive sites.

Homopolymers or copolymers of the monomers mentioned hereinabove are substantially equally effective in eliminating the cracking and crazing encountered during the molding of unsaturated polyester resins. The copolymers utilized in this invention are not limited, however, only to copolymers which are exclusively prepared from the hereinabove described monomeric conjugated dienes as copolymers which are prepared by combining one or more of the above listed monomeric conjugated dienes with one or more unconjugated ethylenically unsaturated monomers can also be utilized. Examples of such unconjugated ethylenically unsaturated monomeric components include the following:

(1) Monoolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), and the like;

(2) Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, chloroethylene (vinyl chloride), 1,1-dichloroethylene (vinylidene chloride), bromoethylene, and the like;

(3) Esters of organic and inorganic acids such as vinyl acetate, vinyl propionate, vinyl butyrate, vinyl isobutyrate, ethyl tiglate, methyl acrylate, ethyl acrylate, propyl acrylate, isopropyl acrylate, butyl acrylate, isobutyl acrylate, dodecyl acrylate, vinyl alpha-chloroacetate, vinyl alpha-chloropropionate, vinyl alpha-bromopropionate, vinyl alpha-iodopropionate, vinyl alpha-bromovalerate, methyl alpha-chloroacrylate, methyl alpha-bromoacrylate, decyl alpha-cyanoacrylate, dimethyl maleate, diethyl maleate, diallyl maleate, dimethyl fumarate, and dimethallyl fumarate;

(4) Organic nitriles such as acrylonitrile, methacrylonitrile, and ethacrylonitrile, and the like;

(5) Monocarboxylic and dicarboxylic acid monomers such as acrylic acid, methacrylic acid, crotonic acid, 3-butenoic acid, and the like, and the anhydrides of such acids where the anhydride exists.

It is to be understood that the above polymerizable olefinic monomers are representative only, and do not include all of the $CH_2=C<$ containing monomers which may be employed.

Of the polymers of conjugated dienes utilized in this invention one of the preferred polymers is a copolymer of butadiene and styrene. These copolymers may contain varying proportions of butadiene and styrene and may be utilized over a wide range of molecular weights, i.e., resins having low molecular weight (250 to about 900) to resins having higher molecular weight (up to about 10,000 or higher). The physical appearance of such resins generally varies from rubbery, elastomeric materials to hard pliable solids. The preparation of such styrene modified butadiene resins is described in U.S. Patents 2,652,342, 2,636,910, 2,672,425, 2,559,947 and others.

These polybutadiene resins may be prepared by a variety of polymerization procedures. One effective method is the use of a fine dispersion of the monomer or monomers in an alkali metal dispersion in non-porous solvents, such as that disclosed in U.S. Patent 2,631,175. The sodium polymerized diene derived synthetic drying oils are especially contemplated for used in the present invention and may contain from 60 percent to 100 percent butadiene and 0 percent to 40 percent vinyl aromatic monomers, such as styrene and vinyl toluene. The copolymer resins and drying oils have molecular weights between about 1,000 and 10,000, preferably about 2,000 to 5,000 and can be heat treated as disclosed in U.S. Patent 2,672,425 or blown in solvent. The oxygen content is between 6 percent and 22 percent, preferably 9 percent to 18 percent. U.S. Patent 2,652,342 particularly discloses the preparation of the acid modified butadiene styrene copolymers. Maleic acid may be employed as the anhydride in amounts ranginging from 0.01 part to 2.5 parts and preferably from 0.05 part to 0.5 part of maleic maleic anhydride to 100 parts of resin. Other acid modifiers include fumaric acid, itaconic acid, acrylic acid or methacrylic acid.

Polycyclopentadiene, another of the polymers of conjugated dienes which is utilized in this invention, can be prepared as a homopolymer of cyclopentadiene or as an interpolymer with various polymerizable monomers, which are listed hereinabove. Methods of preparation of polycyclopentadiene are disclosed in U.S. Patents 2,463,596 and 2,503,972, wherein cyclopentadiene is polymerized at temperatures around 0° C. in the presence of a boron fluoride-dibutyl ether complex.

The homopolymers and copolymers of conjugated diene monomers, as hereinabove described, are utilized in this invention to prevent crazing and cracking of unsaturated polyester resins during molding and during the subsequent curing at elevated temperatures of protective and decorative coatings applied thereto. This desirable result is achieved by incorporating a small amount of a polymer of a conjugated diene, generally from about 0.5 percent to 10 percent by weight, into an unsaturated polyester resin mixture prior to molding. following description generally describes the procedures used.

An unsaturated polyester resin which is useful as a molding resin may be composed of a polyester of an unsaturated dicarboxylic acid, a saturated dicarboxylic acid and a dihydric alcohol, suitably thinned in a $CH_2=C<$ containing monomer and including a suitable polymerization catalyst. Preferred catalysts for this purpose are acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-buty diperhthalate, t-butyl perphthalic acid, t-butyl peracetate and the like. The diazo compounds, such as p-methoxy-phenyl diazo-thio-(2-naphthyl)ether, may also be used as polymerization catalysts. Mixtures of two or more of the above catalysts can be utilized, as can redox catalyst systems.

The catalyst is ordinarily employed in an amount of about 0.1 per cent to 5 percent by weight of the polyester resin component, although larger or smaller amounts may be utilized depending upon the rate at which it is desired to have the polymerization proceed.

To improve the molding properties of such an unsaturated polyester resin system, a small amount of a polymer of a conjugated diene is added. Generally, the polymer of the conjugated diene is utilized in amounts from about 0.5 percent to 10 percent by weight of the polyester resin. The polymer of a conjugated diene is blended into the unsaturated polyester system by stirring or other means of agitation. No special process or equipment is necessary to produce blends of a polymer of a conjugated diene and an unsaturated polyester resin.

Unsaturated polyester resins which have been modified with a polymer of a conjugated diene can be molded or cast by the usual procedures utilized for unmodified unsaturated polyester resins. In order to illustrate the method of molding employed in forming the molded products of the specific examples, reference is made to the attached drawing in which FIGURE 1 is a cross-sectional view of a typical bag molding operation with the mold being in the open position, and FIGURE 2 is a cross-sectional view of the same mold in closed position.

In FIGURE 1, there is shown the bag containing portion of the mold 1, attached by shaft 2 to a raising and lowering means, now shown. Attached to member 1 is the flexible bag member 3, which may be made of rubber, plastic or similar material. Bag member 3 is inflated with air, water or other gas or fluid through inlet pipe 4. The bottom portion of the mold 5 is equipped with heating means 6, the heat being supplied by hot water, or other heated fluid or gas, or by means of electrical heating equipment. Shown in the lower half of the mold is a mat or glass fiber 7, having thereon a layer of the unsaturated polyester-polymer of a conjugated diene blend 8, the resin and mat being movered with a thin film of plastic 9 which serves to prevent sticking of the resin to the bag member during the molding operation.

Figure 2:
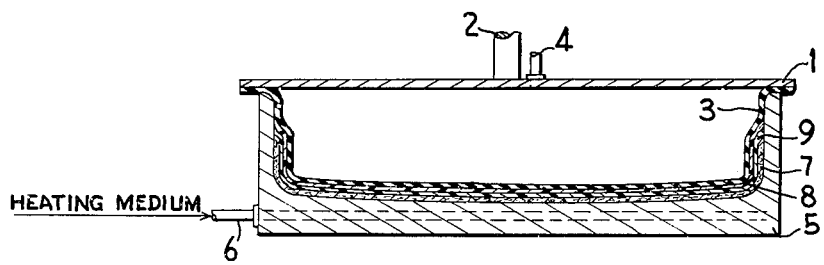

FIGURE 2 shows the mold in the closed position, with top mold member 1 having been lowered so as to force the now inflated bag member 3 into the lower half of the mold 5 and in contact with plastic film 9. With the mold in the closed position it can be seen that the inflated bag conforms with the contour of the lower mold surface forcing the resin blend 8 into the fiber glass mat 7. While the mold is in the closed position, heat supplied to the lower half of the mold through heating means 6 serves to cure the resin to the hardened state, this curing operation normally taking about 5 minutes, although the cure time depends upon the particular resin blend used, catalyst, and temperature of mold 5. After complete cure is obtained, the supper mold half is raised, and the plastic film stripped from the resin surface, and the mold object removed from the mold.

The following examples will illustrate in detail the preparation of unsaturated polyester resins in admixture with polymers of conjugated diene monomers, as well as the preparation of mold products therefrom.

EXAMPLE I

A series of five unsaturated polyester resins was prepared and blended with the polymerizable ethylenically unsaturated monomer, styrene. The polyester composition and the composition of the polyester-styrene blend are set forth in the following table:

| Polyester component | A | B | C | D | E |
|---|---|---|---|---|---|
| Propyleneglycol, moles | | 2.2 | 5.5 | 22 | |
| Diethylene glycol, moles | 5 | | | | |
| Dipropylene glycol, moles | | | | | 5 |
| Maleic anhydride, moles | | 1 | 3 | 9 | |
| Fumaric acid, moles | 3 | | | | 3 |
| Phthalic anhydride, moles | | 1 | 2 | 11 | |
| Isophthalic acid moles | 2 | | | | 2 |
| Polyester acid number | 40–52 | 40–50 | 48–58 | 40–50 | 40 |
| Viscosity (Gardner Holdt; 60 percent solids in methyl cellosolve) | H–J | H–J | F–G | G–H | I+ |
| Weight/parts polyester | 73 | 66 | 72 | 72 | 73 |
| Weight/parts styrene | 27 | 34 | 28 | 28 | 27 |
| Weight/parts hydroquinone inhibitor | 0.011 | 0.03 | 0.018 | | 0.011 |
| Weight/parts triphenyl phosphite | | 0.1 | | | |
| Weight/parts isopropyl catechol | | | | 0.01 | |

EXAMPLE II

The following polymers of conjugated dienes were utilized in these examples:

| Polymer | W | X | Y | Z |
|---|---|---|---|---|
| Type | Butadiene-styrene copolymer. | Butadiene-styrene copolymer. | Polybutadiene | Polymethylcyclopentadiene. |
| Trade name | Buton 100 | Buton 500 | Shell E84.1 | |
| Weight per gallon pounds-solid | 7.65 | 7.62 | 7.64 | |
| Viscosity, poise | 3,000–3,600 | 4,000–4,500 | 200–300 | Solid. |
| Color, Gardner | 1 | | 4+ | |
| Acid number | 0 | | 0 | |

Polymers W and X (Buton 100 and Buton 500) are unmodified butadiene-styrene copolymers containing from about 75 percent to 85 percent butadiene and from 15 percent to 25 percent styrene. During the reaction, the 1,3-butadiene polymerizes with an equal split between 1,2 and 1,4 additions; thus, unsaturation is divided between side vinyl groups and internal double bonds.

Polymer Y (Shell E-84.1) is a polymer of butadiene containing approximately 1.5 carbonyl groups per mold of polymer and with about 30 percent of the unsaturation extant as side vinyl groups.

Polymer Z is a homopolymer of methylcyclopentadiene.

EXAMPLE III

The following description and table lists the procedure used in preparing blends of unsaturated polyester resins with polymers of conjugated dienes and the results obtained when molded laminates were prepared from such modified polyester resins.

To 330 grams of unsaturated polyester resin were added about 7 grams (approximately 2 percent by weight) of tricresyl phosphate-benzoyl peroxide catalyst paste and about 37 grams (approximately 10 percent by weight) of a homopolymer or copolymer of a conjugated diene. The catalyst paste and polymer of a conjugated diene were uniformly distributed throughout the polyester resin by agitating with a laboratory stirrer for about 5 minutes at moderate speeds (300 r.p.m.).

The modified polyester resin was then poured onto the top ply of the three plies of fiber glass mat which had been placed in the lower portion of a matched metal die mold. (Each layer of fiber glass was a 12 inch by 12 inch square of 2 ounce per square foot fiber glass. The bottom two layers, however, had been cut so that a 6 inch by 6 inch square had been removed from the center of the mat. Thus, the final laminate would contain only one ply of reinforcing mat in the center of the sheet). The upper portion of the matched die mold was lowered into position. The mats and resin were compressed to ⅛ inch thickness (original thickness was about ⅜ inch) and subjected to a temperature of 240° F. for a period of one and one-half (1.5) minutes.

The laminate was then removed from the mold and examined for cracks and crazing, especially in the resin-rich area, i.e., the 6 square inch center section containing only one layer of mat, as cracking and crazing are most severe in resin-rich areas.

The following table lists the results observed when various polymers were combined with polyester component A:

Table I

| Laminate | Additive | Percent additive | Results |
|---|---|---|---|
| I | None (Control) | 0 | Severe cracking. |
| II | Polymer Y | 10 | No cracking. |
| III | Polymer W | 10 | Do. |

The molded parts were then coated with a thin film of a thermosetting acrylic resin enamel and baked for one hour at 375° F. Laminates Numbers II and III exhibited no deterioration from the high temperature baking while laminate Number I showed even more severe crazing and warping.

EXAMPLE IV

Laminates were prepared from polyester component A in a similar manner to that hereinabove described in Example III utilizing various levels of polymer X. The following table lists the observed results:

Table II

| Laminate | Additive | Percent additive | Results |
|---|---|---|---|
| IV | None (Control) | 0 | Severe cracking. |
| V | Polymer X | 1 | No cracking. |
| VI | do | 2 | Do. |

EXAMPLE V

Various polyester components and various polymers of a conjugated diene were utilized in preparing laminates in a similar manner to that described hereinabove in Example III. The following table lists the observed results:

Table III

| Laminate | Polyester component | Additive | Percent additive | Results |
|---|---|---|---|---|
| VII | D | None | 0 | Severe cracking. |
| VIII | D | Polymer W | 3 | Moderate cracking. |
| IX | D | do | 6 | Do. |
| X | D | do | 9 | Slight cracking. |
| XI | B | None | 0 | Severe cracking. |
| XII | B | Polymer W | 3 | Moderate cracking. |
| XIII | B | do | 6 | Do. |
| XIV | B | do | 9 | Slight cracking. |
| XV | A | None | 0 | Severe cracking. |
| XVI | A | Polymer W | 3 | No cracking. |
| XVII | A | do | 6 | Do. |
| XVIII | A | do | 9 | Do. |
| XIX | C | None | 0 | Severe cracking. |
| XX | C | Polymer W | 3 | Moderate cracking. |
| XXI | C | do | 6 | Do. |
| XXII | C | do | 9 | Slight cracking. |
| XXIII | D | None | 0 | Severe cracking. |
| XXIV | D | Polymer X | 3 | Moderate cracking. |
| XXV | D | do | 6 | Do. |
| XXVI | D | do | 9 | Slight cracking. |
| XXVII | B | None | 0 | Severe cracking. |
| XXVIII | B | Polymer X | 3 | Moderate cracking. |
| XXIX | B | do | 6 | Do. |
| XXX | B | do | 9 | Slight cracking. |
| XXXI | A | None | 0 | Severe cracking. |
| XXXII | A | Polymer X | 3 | No cracking. |
| XXXIII | A | do | 6 | Do. |
| XXXIV | A | do | 9 | Do. |
| XXXV | C | None | 0 | Severe cracking. |
| XXXVI | C | Polymer X | 3 | Moderate cracking. |
| XXXVII | C | do | 6 | Do. |
| XXXVIII | C | do | 9 | Slight cracking. |

An analysis of the results indicated that additions of butadiene-styrene copolymers to unsaturated polyester resins improved the crack, craze and warp resistance of said polyesters, with the most significant improvement effected with polyester component A, a polyester resin containing isophthalic acid.

EXAMPLE VI

Various polyester components and various polymers of a conjugated diene were utilized in preparing laminates in a manner similar to that described hereinabove in Example III. The following table lists the results:

Table IV

| Laminate | Polyester component | Additive | Percent additive | Results |
|---|---|---|---|---|
| XXXIX | A | None | 0 | Severe cracking. |
| XL | A | Polymer Z | 1 | No cracking. |
| XLI | A | do | 3 | Do. |
| XLII | E | Polymer W | 1 | Do. |
| XLIII | E | do | 3 | Do. |

The polymethylcyclopentadiene polymer, utilized as a 50 percent solution in styrene, effected the greatest improvement of any of the polymers of a conjugated diene tested, and it was found to be quite effective at levels as low as one-half (0.5) percent by weight of the polyester resin.

EXAMPLE VII

Four castings were prepared to establish the effect of a polymer of a conjugated diene additive on the heat distortion properties of an unsaturated polyester resin. The castings, 9 inch by 9 inch by 1/8 inch, were catalyzed with one percent by weight benzoyl peroxide catalyst. Two of the castings were cured for two hours; one hour at 225° F., and one hour at 280° F., while the other two castings were first gelled at 140° F., then cured for one hour at 170° F. and one additional hour at 250° F. The following table lists the results:

*Table V*

| Casting | Polyester component | Additive | Percent additive | Final cure temperature, ° F. | Results |
|---|---|---|---|---|---|
| I | A | None | 0 | 280 | 10 mils at 60° C. |
| II | A | Polymer W | 2 | 280 | 10 mils at 66° C. |
| III | A | None | 0 | 250 | Do. |
| IV | A | Polymer W | 2 | 250 | 10 mils at 64° C. |

The addition of a styrene-butadiene copolymer to an isophthalic acid unsaturated polyester resin did not adversely affect the heat distortion properties of the said polyester resin.

The degree of cracking as recorded in the above examples as severe, moderate and slight may be defined respectively as 20 or more cracks per panel, 5 to 20 cracks per panel and 1 to 5 cracks per panel. The cracks were generally about one-fourth (1/4) inch to one inch in length, and for purposes of rating panels, the longer cracks were assigned a greater weight, e.g., a one-half (1/2) inch crack was considered the equivalent of two cracks of one-fourth (1/4) inch length.

When the above examples are repeated, substituting other polymers of conjugated dienes for those utilized in the examples, compositions are obtained which can be utilized to form substantially crack-free moldings. Similarly, when other unsaturated polyester resins are substituted for those set forth hereinabove, compositions are obtained which are substantially equivalent to those of the specific examples.

While specific examples of the invention have been set forth hereinabove, it is not intended to limit the invention solely thereto, but to include all of the variations and modifications falling within the scope of the appended claims.

We claim:
1. A resinous composition comprising (A) a mixture of 10 percent by weight to 60 percent by weight of a liquid polymerizable, ethylenically unsaturated compound and 40 percent by weight to 90 percent by weight of a polyetser of a dihydric alcohol and an alpha,beta-ethylenically unsaturated dicarboxylic acid, and (B) a polymer of a conjugated diene, said polymer (B) having ethylenically unsaturated reactive sites and being present in an amount of 0.5 percent to 10 percent by weight of said mixture (A).

2. A resinous composition comprising (A) a mixture of 10 percent by weight to 60 percent by weight of styrene and 40 percent by weight to 90 percent by weight of a polyester of a dihydric alcohol and an alpha,beta-ethylenically unsaturated dicarboxylic acid, and (B) a polymer of a conjugated diene, said polymer (B) having ethylenically unsaturated reactive sites and being present in an amount of 0.5 percent to 10 percent by weight of said mixture (A).

3. The resinous composition of claim 2 wherein the polyester includes a saturated dicarboxylic acid component.

4. The resinous composition of claim 1 wherein the polymer of a conjugated diene has a molecular weight of about 250 to about 10,000.

5. The resinous composition of claim 3 wherein the polymer of a conjugated diene is a copolymer of butadiene and styrene having a viscosity of 3,000 to 4,500 centipose.

6. The resinous composition of claim 3 wherein the polymer of a conjugated diene is polymethylcyclopentadiene.

7. The resinous composition of claim 3 wherein the polymer of a conjugated diene is a copolymer of 75 parts to 85 parts of butadiene and 25 to 15 parts styrene.

8. The resinous composition of claim 3 wherein the polymer of a conjugated diene is a butadiene-1,3 homopolymer.

9. The resinous composition of claim 3 wherein the polymer of a conjugated diene is a polymer of butadiene containing about 1.5 carbonyl groups per polymer molecule and having about 30 percent of the unsaturation existing as pendant vinyl groups.

References Cited by the Examiner
UNITED STATES PATENTS
2,609,353   9/1952   Rubens et al. _____ 260—862

MURRAY TILLMAN, *Primary Examiner.*

LEON J. BERCOVITZ, *Examiner.*